UNITED STATES PATENT OFFICE 2,045,899

METHOD OF INCREASING PRODUCTION FROM WELLS

Eugene L. Davis, Long Beach, Calif., assignor to The Texas Company, New York, N. Y., a corporation of Delaware No Drawing. Application April 30, 1935, Serial No. 19,054

10 Claims. (Cl. 166—21)

This invention relates to methods of increasing production from wells such as oil, gas and water wells and more particularly to a method of breaking down or disintegrating the cement sheath surrounding a perforated portion of a well casing so that the oil can flow more readily from the pores in the formation into the casing through the perforations therein. The principal objects of the invention are to provide a method of accomplishing this result in an expeditious and comparatively inexpensive manner and with no damage to the casing or other metal parts of the well.

It is often desirable to "plug back" a well and to perforate the well casing at a depth or zone where the casing is entirely surrounded by cement, in order that the oil may flow into the casing from that zone. It is preferable, if not essential, that the cement sheath be broken down or removed from its position around that portion of the casing where the perforations are made and many different methods have been tried for removing the sheath with but little success. Certain chemical treatments have been devised for dissolving the cement but most of these treatments have been unsuccessful for several reasons, such as the excessive length of time required for the cement to be dissolved, the destruction or impairment of the steel casing and other metal parts in the well due to their being attacked by the acid, and the high expense of the acid used.

In accordance with the invention, it has been found that an aqueous solution of acetic acid will cause the cement to be readily broken down or disintegrated without damage to the casing or other metal parts in the well. After the metal casing of the well has been perforated at the desired depth, the solution is introduced into the well and allowed to remain for several hours after which it is removed by bailing or otherwise. The solution in passing through the perforations in the casing attacks the cement sheath and causes it to crumble and disintegrate and the oil may thus pass freely from the earth formations into the casing.

It has been found that an aqueous solution containing 30% by weight of acetic acid is particularly suitable for this purpose, although higher or lower concentrations may be of advantage, the choice of the proper concentration being dependent upon the particular conditions obtained. The disintegrating action of the solution on the cement will be increased with higher temperatures and therefore if the temperature prevailing in the well at the depth where it is desired to remove the cement sheath should be relatively high, a solution having a lower concentration of acid could obviously be used to good effect.

Other water soluble aliphatic acids of low molecular weight such as formic, propionic and butyric acids can be used and may be of advantage in certain locations.

In a test which has been made on a well which had become unproductive, the casing was perforated at the desired depth after which a barrel of 80% acetic acid was run into the well followed by sufficient water to make a 30% solution. The solution was then agitated by swabbing and after about 36 hours the solution was neutralized with dehydrated lime in order to eliminate any danger that the operators might be burned by the chemical. After the solution was neutralized the chemicals were bailed from the well. The well was then washed and swabbed and during this time and subsequently thereto oil and gas passed into the well in considerable quantities through the perforations in the casing.

It is well known that wells can be heated artificially by various methods such as by the use of steam or hot water and the action of the solution on the cement could thus be speeded up by heating that portion of the well where the acid solution is in contact with the cement. With the temperature in a California well at a depth of 2000 feet estimated at 110° F. it will be seen that a cement sheath will be so disintegrated in a very few hours that oil will have no difficulty in passing through the cement and into the casing through the perforations in the latter.

Where desirable, pressure may be placed upon the acid solution for forcing it more rapidly through the casing perforations into contact with the cement.

It has further been found that the acid solution has a beneficial effect in breaking down the mud sheath on the formation surrounding the perforated portion of the casing.

The water soluble aliphatic acid solutions do not harm the casing or other metal parts of the well and this is an important advantage, particularly in view of the lasting damage which is often done to the metal parts through the use of other acids.

Obviously many modifications of the invention may be made without departing from the spirit and scope thereof, and therefore no limitations are intended except as imposed by the appended claims.

I claim:

1. A method of increasing the production of a well having a casing set in cement which comprises maintaining an aqueous solution of acetic acid in contact with said cement until the cement has been disintegrated and then removing said solution from the well.

2. A method of increasing the production of a well having a casing set in cement which comprises perforating said casing at the desired depth and then disintegrating the cement surrounding the casing at that depth by means of an aqueous solution of acetic acid.

3. A method of increasing the production of an oil well having a casing set in cement which comprises perforaating said casing at the desired depth, maintaining in said well an aqueous solution of acetic acid until the cement surrounding the perforated portion of the casing has been broken down, neutralizing the solution and then removing the solution from the well.

4. A method of increasing the production of an oil well having a casing set in cement which comprises perforating said casing at the desired depth, maintaining in said well a substantially 30% aqueous solution of acetic acid until the cement surrounding the perforated portion of the casing has been disintegrated, neutralizing the solution with dehydrated lime, removing said solution from the well and then swabbing said well.

5. A method of increasing the production of an oil well having a casing set in cement which comprises perforating said casing at the desired depth, maintaining in said well an aqueous solution of acetic acid until the cement surrounding the perforated portion of the casing and the mud sheath adhering to the formation around the perforated portion of the casing have been broken down, and then cleaning the well.

6. A method of increasing the production of an oil well having a casing set in cement which comprises perforating said casing at the desired depth, maintaining in said well a substantially 30% aqueous solution of acetic acid until the cement surrounding the perforated portion of the casing and the mud sheath adhering to the formation around the perforated portion of the casing have been broken down, and then cleaning the well.

7. A method of increasing the production of an oil well having a casing set in cement which comprises disintegrating the cement surrounding the casing by means of a heated 30% aqueous solution of acetic acid.

8. A method of increasing the production of an oil well having a casing set in cement which comprises perforating said casing at the desired depth and then forcing an aqueous solution of acetic acid through the perforations into contact with the cement to disintegrate the cement so that oil can pass into the casing from the surrounding formations.

9. A method of increasing the production of a well having a casing set in cement which comprises perforating the casing at the desired depth and then forcing an aqueous solution of acetic acid through the perforations into contact with the cement while artificially heating the solution so as to disintegrate the cement.

10. A method of increasing the production of a well having a casing set in cement which comprises perforating said casing at the desired depth and then disintegrating the cement surrounding the casing at that depth by means of a water soluble organic acid selected from the group consisting of formic, acetic, propionic and butyric acids.

EUGENE L. DAVIS.